United States Patent Office 3,340,143
Patented Sept. 5, 1967

3,340,143
CERTAIN 3,5-DINITROBENZAMIDE DERIVATIVES
FOR TREATING COCCIDIOSIS
Jack Bernstein, New Brunswick, N.J., assignor to E. R. Squibb & Sons, Inc., New York, N.Y., a corporation of Delaware
No Drawing. Filed May 18, 1966, Ser. No. 550,933
12 Claims. (Cl. 167—53.1)

This invention relates to animal feed compositions. More particularly, this invention relates to animal feed compositions containing certain benzamide compounds.

Coccidiosis is a disease affecting primarily poultry and is caused by protozoa of the genus Eimeria, especially *E. tenella*, *E. necatrix* and *E. acervulina*. This disease causes severe and frequently fatal infection in poultry flocks. It constitutes a serious economic hazard.

Current practice in poultry raising is the feeding of coccidiostatic preparations in the general diet as a prophylactic measure. Known coccidiostats have failings in that they are not as highly effective as desirable, do not exert their effect against all species of infective organisms, are not free of undesirable side effects and/or are not economically feasible. It is an object of this invention to provide compounds and compositions which prevent the development and spread of coccidiosis effectively at low, economical levels and also for administration in treatment of the disease.

The compounds of this invention have the formula (I) 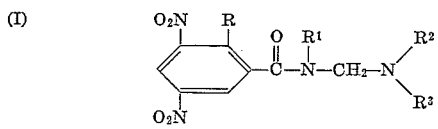

wherein R and $R^1$ each represents hydrogen or lower alkyl, $R^2$ and $R^3$ each represents hydrogen, lower alkyl, hydroxy-lower alkyl, carboxylower alkyl, or aralkyl, or together with the nitrogen to which they are attached form a 5- to 7-membered monocyclic, nitrogen heterocyclic, subject to the proviso that only one of $R^2$ and $R^3$ may be hydrogen.

The lower alkyl groups in all of the substituents referred to above are straight or branched chain hydrocarbon groups such as methyl, ethyl, propyl, isopropyl, butyl, s-butyl, t-butyl and the like. In each instance, methyl is the preferred lower alkyl group.

The aralkyl groups are monocyclic radicals preferably phenyl-lower alkyl groups, e.g., benzyl and halo, lower alkyl, lower alkoxy or amino substituted derivatives.

The heterocyclics represented by the group

include piperidine, morpholine, pyrrolidine, piperazine, thiamorpholine, as well as, $R^2$ substituted derivatives of these heterocycles.

The compounds of Formula I may be synthesized in general according to the procedures given below or those given by chapter 10, the Mannich Reaction, Organic Reactions, volume 1, pages 303–341, published in 1942 by Wiley & Sons, New York, and the references therein. Thus about one mole of a primary or secondary amine is reacted with at least one mole of formaldehyde or a polymer thereof and about one mole of the dinitrobenzamide.

These Mannich bases also form salts from acids such as hydrochloric, sulfuric, sulfonic, tartaric, glycolic, phosphoric, succinic, acetic and the like.

The compounds of Formula I, and especially 3,5-dinitro-N-(piperidinomethyl)benzamide, are most effectively provided to the animal in its food or drink. Thus it may be placed in solution or in suspension in its drinking water or preferably admixed in the feed composition, either the base form or acid salt being used.

The compositions of this invention may be produced by intimately dispersing the active ingredient or ingredients throughout a carrier or diluent which is either solid or liquid. Preferably, the compound is thoroughly admixed with a major proportion of poultry feed supplied to the fowl, e.g., chick starter, broiler and grower feeds, laying mashes, breeder and turkey breeder mashes, turkey starter and grower feeds and the like.

The active material may also be incorporated in premixes wherein higher proportions of the active ingredients are present. The concentrated premix is then diluted with additional feed by the feed supplier or poultry grower, for example, one pound of premix per ton of feed, to obtain a feed containing the requisite amount of coccidiostat.

It will also be appreciated that the active ingredient may be supplied in combination with an inert carrier or diluent such as Attapulgus clay, bentonite or edible vegetable materials. Liquid dispersions in water can be prepared by using emulsifiers and/or surface active agents.

The amount of Formula I or its salt incorpoarted in the food or water is in the range of about 0.005 to 0.5% (by weight) preferably about 0.02 to 0.04%. In addition, the incorporation of a tetraalkylthiuram disulfide, e.g., a tetra-lower alkyl thiuram disulfide as tetramethylthiuram disulfide, tetraethylthiuram disulfide and the like, frequently enhance the action of a compound of Formula I and thus conserve the amount of the latter required. Thus, a total of about 0.005 to 0.1% (by weight) preferably about 0.01 to 0.03% of the combined substances in the feed is usually adequate. Approximately equal proportions (percent by weight) of the two components is sufficient, but a ratio of about 1 to 3 parts of the amide to about 1 to 3 parts of the disulfide may be used. The preferred combination contains 3,5-dinitro-N-(piperidinomethyl)benzamide and tetraethylthiuram disulfide.

The following examples are illustrative of the invention. All temperatures are on the centigrade scale.

EXAMPLE 1

*Preparation of 3,5-dinitro-N-(piperidinomethyl) benzamide*

To a solution of 10 grams of 3,5-dinitrobenzamide in 150 ml. of hot ethanol there is added 4 grams of piperidine and 3.6 grams of a 40% aqueous formaldehyde solution. The mixture is refluxed for four hours and then concentrated. The crude product is purified by crystallization from benzene. The pure compound melts at 142–144° C.

The hydrochloride is prepared by dissolving the purified base in alcohol and treating with one equivalent of an ethereal hydrogen chloride solution. The product is isolated by concentration and trituration with ether, and melts at 181°.

By replacing the 3,5-dinitrobenzamide with an equivalent amount of 3,5-dinitro-o-toluamide, there is obtained 3,5-dinitro-N-(piperidinomethyl)-o-toluamide.

By replacing the piperidine with an equivalent amount of diethylamine and utilizing either 3,5-dinitrobenzamide or 3,5-dinitro-o-toluamide, there is obtained 3,5-dinitro-N-(diethylaminomethyl)benzamide and 3,5-dinitro-N-(diethylamino)-o-toluamide, respectively.

EXAMPLE 2

A conventional basal ration having the following ingredients is prepared:

Meat and bone scrap
Fish meal
Vitamin $B_{12}$

Poultry-by-product meal
Dehulled soybean oil meal
Dehydrated alfalfa meal
Corn gluten meal
Pulverized oats
Ground barley
Corn meal
Wheat middlings
Dried grain and whey fermentation solubles
Methionine hydroxy analogue calcium
Riboflavin
Calcium pantothenate
Choline chloride
Niacin
Animal fat
Menadione sodium bisulfite
Vitamin E supplement
Butylated hydroxytoluene
Vitamin A palmitate
D-activated animal sterol
Calcium carbonate
Defluorinated phosphate
Salt
Calcium iodate
Manganese oxide
Zinc oxide
Cobalt hydroxide
Cobalt carbonate A feed composition is prepared by adding 3,5-dinitro-N-(piperidinomethyl)benzamide to the basal ration in an amount constituting 0.03% by weight of the final mixture. The ingredients are thoroughly admixed to provide the ration which is fed to young chicks about 3 weeks old.

EXAMPLE 3

A chick feed is prepared as in Example 2 but substituting 0.03% by weight of 3,5-dinitro-N-(piperidinomethyl)-o-toluamide.

EXAMPLE 4

A basal ration is prepared as in Example 1. To the basal ration are added 0.01% by weight of 3,5-dinitro-N-(piperidinomethyl)benzamide and 0.01% by weight of tetramethylthiuram disulfide. The ingredients are thoroughly admixed and utilized in the same manner as in Example 2.

EXAMPLE 5

*Preparation of 3,5-dinitro-N-(dimethylaminomethyl) benzamide, hydrochloride*

Twenty-one grams of 3,5-dinitrobenzamide, 3 grams of paraformaldehyde and 8.2 grams of dimethylamine hydrochloride are added to 800 ml. of absolute alcohol and the mixture refluxed for three hours. The reaction mixture is then concentrated to 200 ml. and diluted with ether to precipitate the desired 3,5-dinitro-N-(dimethylaminomethyl)benzamide, hydrochloride.

The salt may be converted to the free base by solution in water and neutralization with one equivalent of aqueous sodium hydroxide.

EXAMPLE 6

*Preparation of 3,5-dinitro-N-(2-carboxyethylaminomethyl)benzamide*

By substituting an equivalent amount of β-alanine for hydroxy-lower alkyl, carboxy-lower alkyl or monocyclic 3,5-dinitro-N-(2-carboxyethylaminomethyl)benzamide.

Compositions utilizing the compounds of Examples 5 and 6 or other compounds of Formula I or salts thereof above may similarly be prepared.

What is claimed is:
1. A poultry feed composition having coccidiostatic activity comprising an effective coccidiostatic amount of a coccidiostat of the group consisting of a compound of the following formula and acid salts thereof

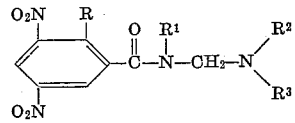

wherein R and $R^1$ each represents hydrogen or lower alkyl, $R^2$ and $R^3$ each represents hydrogen, lower alkyl, hydroxy-lower alkyl, carboxy-lower alkyl or nonocyclic aralkyl, subject to the proviso that only one of $R^2$ and $R^3$ is hydrogen, or $R^2$ and $R^3$ together with the nitrogen to which they are attached form a 5- to 7-membered monocyclic nitrogen heterocyclic, and a poultry feed.

2. A composition as in claim 1 wherein the compound of the formula is 3,5-dinitro-N-(piperidinomethyl)benzamide.

3. A composition as in claim 1 wherein the compound of the formula is 3,5-dinitro-N-(piperidinomethyl)-o-toluamide.

4. A composition as in claim 1 containing 0.005 to 0.5% by weight of the active ingredient.

5. A composition as in claim 1 comprising in addition tetraalkylthiuram disulfide.

6. A composition as in claim 2 comprising 0.005 to 0.1% by weight of the benzamide and tetramethylthiuram disulfide.

7. A method of treating coccidiosis which comprises orally administering to the infected animal an animal feed comprising a minor proportion of a coccidiostat of the group consisting of a compound of the formula and acid salts thereof

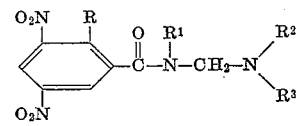

wherein, R, $R^1$ and $R^2$ are as defined in claim 1 and a carrier therefor.

8. A method in accordance with claim 7 wherein the compound of the formula is 3,5-dinitro-N-(piperidinomethyl)benzamide.

9. A method in accordance with claim 7 wherein the compound of the formula is 3,5-dinitro-N-(piperidinomethyl)-o-toluamide.

10. A method in accordance with claim 7 wherein the composition contains 0.005 to 0.5% by weight of the active ingredient.

11. A method in accordance with claim 7 wherein the animal feed also contains tetraalkylthiuram disulfide.

12. A method in accordance with claim 8 wherein the animal feed contains 0.005 to 0.1% by weight of an equal mixture of the benzamide and tetramethylthiuram disulfide.

References Cited

UNITED STATES PATENTS 3,152,136  10/1964  Harris et al. _____ 260—295

OTHER REFERENCES

Chem. Abstracts, 59, page 561a (1963).

ALBERT T. MEYERS, *Primary Examiner.*

R. S. BARRESE, *Assistant Examiner.*

UNITED STATES PATENT OFFICE

CERTIFICATE OF CORRECTION

Patent No. 3,340,143                          September 5, 1967

Jack Bernstein

It is hereby certified that error appears in the above numbered patent requiring correction and that the said Letters Patent should read as corrected below.

Column 2, line 24, for "incorpoarted" read -- incorporated --; line 65, for "ethylamino)-o-" read -- ethylaminomethyl)-o- - column 3, line 66, strike out "hydroxy-lower alkyl, carboxy-lower alkyl or monocyclic" and insert instead -- the piperidine in Example 1, there is obtained the desired --; column 4, line 14, for "nonocyclic" read -- monocyclic --.

Signed and sealed this 1st day of October 1968.

(SEAL)
Attest:

Edward M. Fletcher, Jr.                        EDWARD J. BRENNER
Attesting Officer                              Commissioner of Patents